US008515241B2

(12) United States Patent
Forsyth et al.

(10) Patent No.: US 8,515,241 B2
(45) Date of Patent: Aug. 20, 2013

(54) REAL-TIME VIDEO EDITING (75) Inventors: Robert Forsyth, Colesville, MD (US); David Levinson, Bronx, NY (US); Elvin Saunders, Jr., Astoria, NY (US)

(73) Assignee: Gannaway Web Holdings, LLC, Long Island City, NY (US)

( * ) Notice: Subject to any disclaimer, the term of this patent is extended or adjusted under 35 U.S.C. 154(b) by 27 days.

(21) Appl. No.: 13/334,673

(22) Filed: Dec. 22, 2011

(65) Prior Publication Data
US 2013/0011121 A1 Jan. 10, 2013

Related U.S. Application Data (60) Provisional application No. 61/505,471, filed on Jul. 7, 2011.

(51) Int. Cl.
*H04N 5/93* (2006.01)

(52) U.S. Cl.
USPC .......................................... 386/239; 386/241

(58) Field of Classification Search
USPC .................. 386/245, 241, 239, 278, 282, 290
See application file for complete search history.

(56) References Cited

U.S. PATENT DOCUMENTS

| 6,289,163 | B1 | 9/2001 | Wang |
| 6,931,545 | B1 | 8/2005 | Ta et al. |
| 7,406,603 | B1 | 7/2008 | MacKay et al. |
| 7,739,599 | B2 | 6/2010 | Patten et al. |
| 7,769,819 | B2 | 8/2010 | Lerman et al. |
| 7,809,802 | B2 | 10/2010 | Lerman et al. |
| 2005/0246282 | A1 | 11/2005 | Naslund et al. |
| 2006/0251384 | A1 | 11/2006 | Vronay et al. |
| 2007/0027839 | A1* | 2/2007 | Ives .................................. 707/3 |
| 2007/0027844 | A1 | 2/2007 | Toub et al. |
| 2007/0107032 | A1 | 5/2007 | Rachamadugu |
| 2007/0124282 | A1 | 5/2007 | Wittkotter |
| 2010/0080529 | A1 | 4/2010 | Barton et al. |
| 2010/0183278 | A1 | 7/2010 | Black et al. |
| 2010/0260468 | A1 | 10/2010 | Khatib et al. |

FOREIGN PATENT DOCUMENTS
WO WO 2007/038375 A2 4/2007

* cited by examiner

*Primary Examiner* — Robert Chevalier
(74) *Attorney, Agent, or Firm* — Woodcock Washburn LLP (57) ABSTRACT

To accomplish frame-accurate capturing and/or editing of live or recorded video content in a web-based user interface, video content received from a source is stored in individual video frames in a database. Metadata (e.g., closed caption data) and/or visual graphic thumbnails also is stored in the database and used to edit the video content in a frame-accurate manner. Each frame of the video content, each portion of metadata, and/or a visual graphic thumbnail may be associated with a timestamp reference for synchronization. The frame-accurate video editing may be performed by an end user or automated based on user configurations.

22 Claims, 6 Drawing Sheets

REAL-TIME VIDEO EDITING

CROSS-REFERENCE TO RELATED APPLICATIONS

This application claims benefit to U.S. Provisional Application Ser. No. 61/505,471, filed Jul. 7, 2011, entitled "Real-Time Video Editing System," which is hereby incorporated by reference in its entirety.

BACKGROUND

Many web-based video editing systems used today are imprecise when it comes to editing streams of video content received from a source. It is not uncommon for web-based video editing systems to receive video content in segments and store the segments in various file-based storage mediums for editing. For example, video content may be stored in one contiguous file or many smaller files that are returned to the end user at playback as a single video stream. Currently, web-based video content is buffered and the buffered video is stored in chunks of multiple frames, referred to as key frames. The editing of video content that is stored in key frames may be inaccurate, because the editing is based on an estimate of where a frame resides in its corresponding key frame.

Editing streams of video content received from multiple sources, at a web-based video editing system, may also be inconvenient and time consuming. For example, the router control used for receiving video content from a source may not be conveniently located for the users to quickly and/or easily change the source video content feeds, as the video feed may have to be manually changed. In some instances, the end user of the video editing system may have make a phone call to engineering support to change the video feed into the video editing device.

SUMMARY

Various techniques for capturing and/or editing of video content using a computing device are described herein. In an example embodiment a method is described for enabling web-based editing of video content. As described herein, a stream of video content may be received from a source in real time. The stream of video content may include frames of the video content. Closed caption data may be received that is associated with the video content. A frame of the video content may be stored in a database separately from other frames of the video content. The closed caption data may also be stored in the database. A visual graphic thumbnail may be created that is representative of the frame of the video content. The frame of the video content, the closed caption data, and the visual graphic thumbnail may be associated with a timestamp reference. The frame of the video content, the visual graphic thumbnail, and the closed caption data may be sent, via a web interface, for being stored and displayed in a time-synchronized manner to enable editing of the video content.

According to another embodiment, a system is described for enabling web-based editing of video content. The system may be configured to receive a stream of video content from a source in real time. The stream of video content may comprise frames of the video content and/or closed caption data associated with the video content. A frame of the video content may be stored in a database separately from other frames of the video content. The system may also be configured to receive closed caption data and may store the closed caption data in the database. The system may be further configured to create a visual graphic thumbnail that is representative of the frame of the video content. The system may associate the frame of the video content, the closed caption data, and/or the visual graphic thumbnail with a timestamp reference. Finally, the system may be configured to send, via a web interface, the frame of the video content, the visual graphic thumbnail, and/or the closed caption data for being displayed in a time-synchronized manner to enable web-based editing of the video content.

According to another embodiment, a computer-readable storage medium is described herein that may have computer-executable instructions stored thereon that are configured to cause a computer processor to receive a stream of video content from a source in real time and store a frame of the video content in a database separately from other frames of the video content. The computer-executable instructions may also be configured to cause the processor to receive closed caption data associated with the video content and store the closed caption data in the database. The computer-executable instructions may be further configured to cause the processor to create a visual graphic thumbnail that is representative of the frame of the video content and associate the frame of the video content, the closed caption data, and the visual graphic thumbnail with the timestamp reference. Finally, the computer-executable instructions may be configured to cause the processor to send, via a web interface, the frame of the video content, the visual graphic thumbnail, and the closed caption data for being displayed in a time-synchronized manner to enable web-based editing of the video content.

According to another embodiment, a video editing device is described herein for enabling web-based control of video content from multiple sources. The sources from which the video editing device receives video content may be controlled from within a user interface (UI) for example.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Exemplary embodiments will be described in connection with the associated figures, of which.

DETAILED DESCRIPTION OF ILLUSTRATIVE EMBODIMENTS

Described herein are systems, methods, and apparatus for video capturing and/or web-based editing of video content using a computing device. The systems, methods, and apparatus described may enable frame-accurate capturing and/or editing of video content and/or other data associated with video content.

Figure 1:
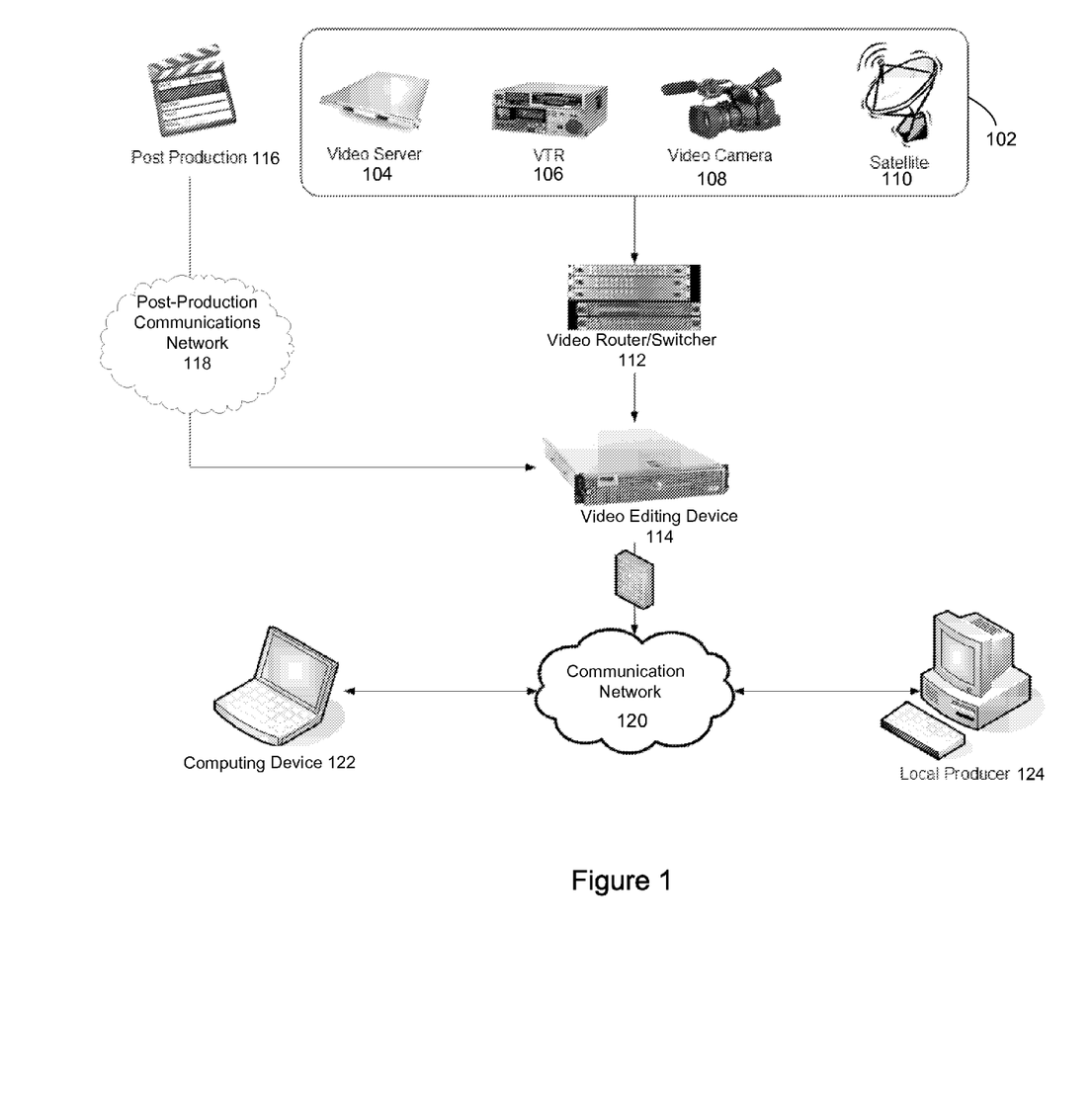
FIG. 1 is a diagram illustrating a process for capturing and/or editing video content using a video editing device.

FIG. 1 is a diagram illustrating a process for frame-accurate capturing and/or web-based editing of video content using a video editing device 114. The frame-accurate capturing and/or editing functionality described herein may be performed without interrupting the stream of video content being received at the video editing device 114. The editing functionality may include controlling and/or clipping the video content as described herein. As illustrated in FIG. 1, video content may be created at and/or received from a video source 102. The video source 102 may include a video server 104, a video tape recorder (VTR) 106, a video camera 108, a satellite 110, and/or any other device capable creating and/or sending video content. The video content may be live or recorded video content. The video content may be pushed by and/or pulled from a video source 102 to video editing device 114. The video content may be captured, stored, and/or sent using a video editing device 114. The video content may include standard definition and/or high definition formats for example (e.g. H.264, FLV (VP6), WMV, 3GP, H.263, windows mobile, MPEG-2, and/or MPEG-4 formats).

The video editing device 114 may receive the video content from a video source 102. The received video content may include any form of video content that may be displayed to an end user for web-based video editing. For example, the video content may be received in any format, at any resolution, bit-rate, and/or aspect ratio. The format of the video content may be stream-based or file-based video content for example. In a live stream/capture environment, the video content may be transmitted and/or received by the video editing device 114 using a wire in analog and/or digital baseband format.

Metadata may be embedded in the video content, such as in the form of closed captioning data for example. According to one example, the closed captioning data may be embedded in a video stream on analog (e.g., line 21) or AS 608/708 embedded captioning in digital video. The video editing device 114 may import external metadata from outside systems to be used to create edit points and/or assign additional metadata, such as a headline or location from a newsroom computer system (e.g., ENPS). For example, the video editing device 114 may tap into external live streams of media content. According to an embodiment, the video editing device 114 may receive live streams of media content from a reporter's mobile device.

After receiving an external live stream of video content, a producer may manipulate the remote content on the video editing device 114 in a similar manner as described with regard to locally captured video content herein. The video editing device 114 may utilize virtual markers in the capture and/or editing timelines to insert live text feeds into the video content. The live text feed may be inserted into the video content post sub clip creation for example. The live text feeds may be used to import (e.g., in real time) social media content, such as TWITTER feeds and/or FACEBOOK comments for example, into the video content provided to a user.

The video editing device 114 may enable the insertion of external markers and/or instructions corresponding to a video editing device 114 instruction language structure. The external markers and/or instructions may be inserted into a video content timeline and sub clips may be used for additional external content to be blended into a video player on the video editing device 114 as the content is played on a web-based user interface (e.g., a website). These instructions may be executed in the player to import additional live content, such as graphics, TWITTER feeds and other social media, but the command, timeline-specific markers may be generated in the video editing device 114.

The video editing device 114 may receive video content from the video source 102 through a communication network that includes video router/switcher 112. The communication network may be capable of transmitting and/or receiving video content and/or metadata. Exemplary embodiments of the communication network may include a public or private communication network, such as a telecommunications network, the Internet, a file transfer protocol (FTP) communication network, and/or a local area network (LAN). The video router/switcher 112 may be an HD and/or SDI router for example. The video router/switcher 112 may send and/or receive the video content via a wireless (e.g., wireless communication network) and/or wired (e.g. coaxial cable) communication medium.

Figure 3:
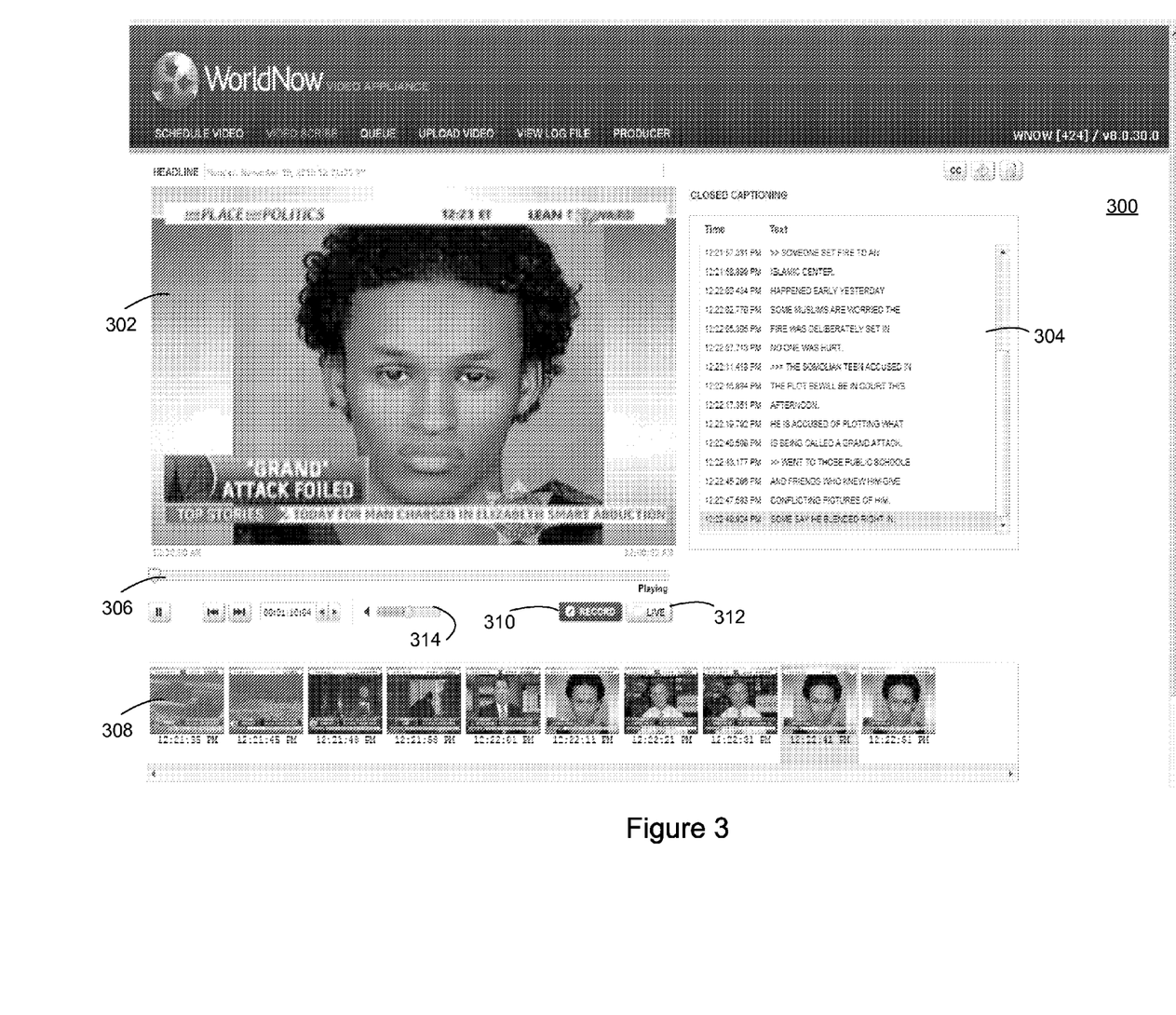
FIG. 3 is an exemplary illustration of a user interface (UI) that may be displayed by a video editing device.
Figure 4:
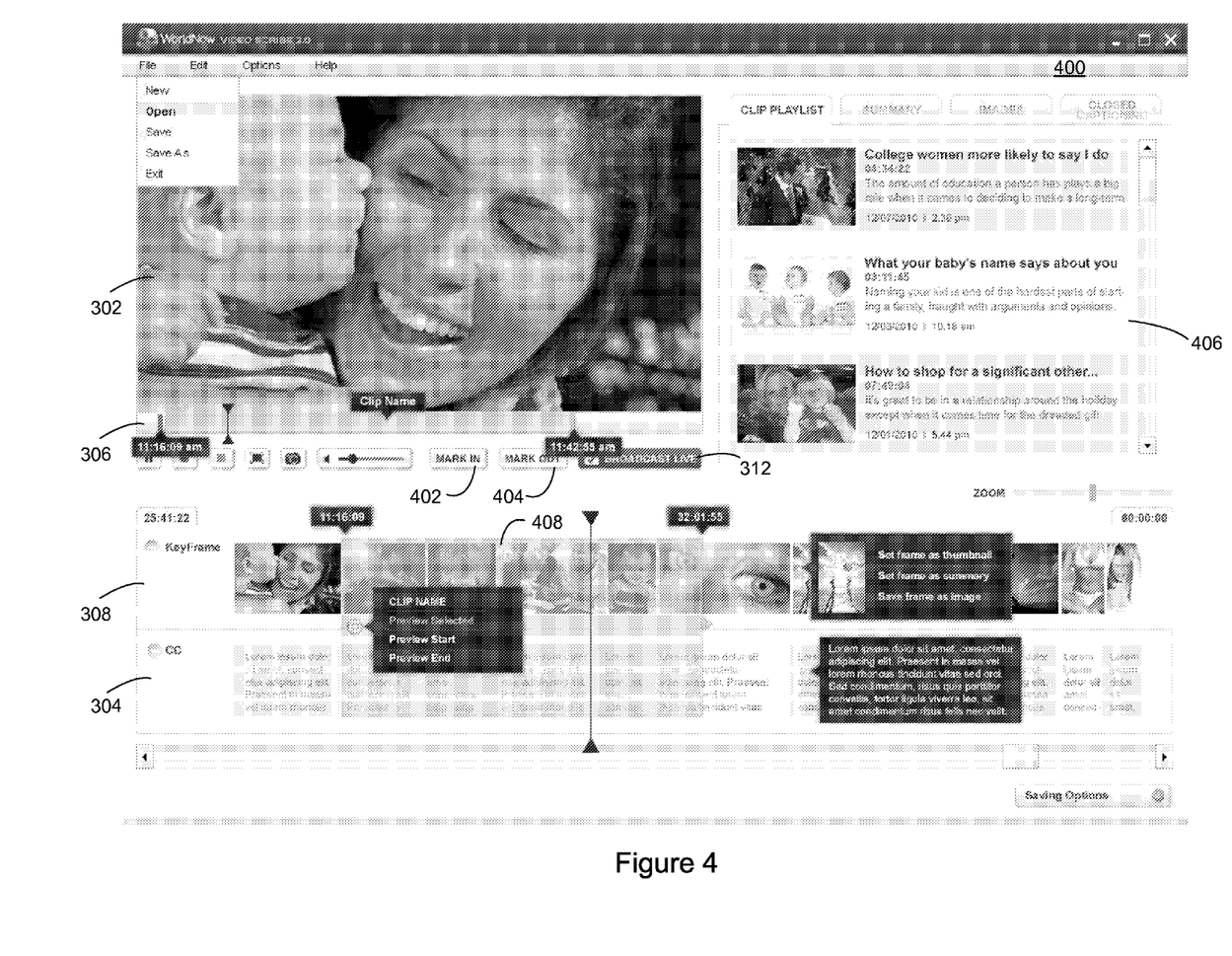
FIG. 4 is another exemplary illustration of a user interface (UI) that may be displayed by a video editing device.

The video editing device 114 may enable control of the video router/switcher 112 from within a user interface (UI), such as UI 300 or UI 400 illustrated in FIGS. 3 and 4 for example. In an example embodiment, the UI may provide input buttons to a user that may correspond to inputs on the video router/switcher 112. Each button may be programmable by the client and/or may be executed through rs422 or rs232 protocols. The video router/switcher 112 may enable the routing of video and/or audio signals between devices, such as video source 102 and video editing device 114 for example. In some implementations, the video router/switcher 112 may be controlled by a computing device, such as video editing device 114, with remote access panels. The wiring connecting these devices may be physically connected to the video router/switcher 112. The video router/switcher 112 may select a destination device on the panel and select a source device from which video content may be sent. The video router/switcher 112 may support various external connection protocols to enable control from other devices, such as automation computers and/or switchers for example. The video router/switcher 112 may support RS-422, RS-232, Internet Protocols and/or GPI closed contact closures for example.

Video source 102 may be utilized to capture video content for the web. Dynamic router control may be used to control video feeds from video source 102 (e.g., microwave locations, satellite feeds, etc.) to internal sources (e.g., control rooms, edit bays, etc.). The video editing device 114 may utilize the various protocols described herein to enable customizable router control from within a UI, such as UI 300 or UI 400 illustrated in FIGS. 3 and 4. Users may be able to add buttons to the UI that correspond to the router sources in the station's core router. Customized text may be displayed on the button in the UI that may correspond to the name of the video source, such as 'LIVE1' or 'SAT14' for example. Each button may contain a custom communications string that the video router/switcher 112 will understand and/or execute. For example, when the 'LIVE1' button is pushed, the video editing device 114 may dispatch a communication to the video router/switcher 112 through the appropriate external protocol that may instruct the video router/switcher 112 to change the video feed on the hardware to the new source. According to one embodiment, in RS-422 deployments, the video editing device 114 may send the string 'X1X1-V1A1-D323-S14' to the video router/switcher 112. The communication may be made using the following exemplary format: X1X1—Attention for the device; V1A1—Switch video and audio; D323—Destination ID 323 (e.g., video editing device 114); S14—Source ID 14 (e.g., LIVE1). Video editing device 114 may place a virtual marker on the video timeline to denote the video router/switcher 112 change and may include notes on the video router/switcher 112 change.

After the video content is received at the video editing device 114, it may be stored in a frame-accurate manner. For example, the video content may be received and/or stored frame-by-frame at the video editing device 114. The video editing device 114 may stream video content to users (e.g., via the internet or other communication network) for live consumption in a web-based environment, while storing and/or editing frames of the video content. The video editing device 114 may capture high resolution and/or low resolution proxy versions of each frame. Binary blob fields may be used for storing each frame of the video content. The video editing device 114 may store each frame separately in a database (e.g., a large scale SQL database). For example, each frame may be stored in a cell and/or table in the database. While a single database is described, the database may include one or more databases stored on the video editing device 114 and/or remotely on another computing device. Each frame may be moved and/or stored into the database at the exact point in time that it is captured. For example, the video content may be captured and/or stored in the database at a rate of thirty frames each second. This may enable a granular, single-frame accurate, presentation and/or control during the viewing and/or web-based editing of the video content.

The video content may be stored and associated with one or more timestamp references. For example, each frame of video content may be stored with a corresponding timestamp reference that may be referenced upon retrieval of the video frame. The timestamp reference may be stored in the database with the frame to which it corresponds or in a separate database for example.

The video content may be received and/or stored in high and/or low resolution. For example, as the video is captured, the video editing device 114 may store an uncompressed raw video frame in a database. The video editing device 114 may resize the video frame into a smaller, lower resolution version to store in the database with the same timestamp reference as the full resolution video frame. Adaptive buffering may also be implemented when receiving and/or storing video content. For example, because the video editing device 114 stores the lower resolution copy of the video frame in the same manner and/or reference point as the high resolution copy, the user interface may provide a quick response time to a user, in video cueing and/or visual representation as a pointer is moved up and down the video timeline. When a user moves the pointer on the video timeline, the video editing device 114 may deploy an adaptive buffering algorithm to start working on the frame of the video. The video editing device 114 may move the pointer and display the video in a video display. For example, the video editing device 114 may request a single frame of the low-resolution proxy based on the timestamp reference associated with the frame. The video editing device 114 may display the requested frame of the video content. Once the video editing device 114 has displayed the video frame, the video editing device 114 may increase the number of frames stored in the local buffer. For example, the video editing device 114 may double the amount of video frames received from the database and store the requested frames in the local buffer.

According to an example embodiment, at the moment of a request for video content on a timeline, the video editing device 114 may receive a frame and store the frame in the local buffer. The video editing device 114 may request the next two frames and store those frames in the local buffer. The video editing may then request four frames, and continue to double the number of frames requested for storing in the local buffer until the buffer is full. The local buffer may be a five second buffer, for example, but may be configurable by the client to any other size. After the local buffer is full, the video editing device 114 may reverse the process and request descending multiples of frames to maintain the size of the local buffer. Each time the point on the timeline of video content is changed, the video editing device 114 may determine whether the new point corresponds to data already stored in the local buffer. If the point on the timeline does not correspond to data in the local buffer, the local buffer may be cleared and frames may begin being retrieved in the manner described herein. By retrieving frames as described herein, the video editing device 114 may adapt local resources of the video editing device 114 for network traffic conditions to ensure that the video editing device 114 does not request unnecessary frames that will not be utilized.

The video editing device 114 may support multiple video codecs (e.g., more than 30 standalone video codecs) for creating file-based assets. The video codecs may be used for receipt and/or distribution of video content. Exemplary input and/or output formats that may be supported on the video editing device 114 may include Windows Media (e.g., Planar YUV, S-Mpeg4 v3, Windows Media 9, Screen Video, WMPv7, WMPv8, WMPv9, or any other Windows Media format), QuickTime (e.g., Apple Graphics, H.264, mp4v, ITU H.263, Sorenson Video 1, Sorenson Video 3, AVC, ISO MPEG-4, or any other QuickTime format), MPEG-1, MPEG-2, AVI (e.g., BI_RGB Raw Bitmap, DVC/DV Video, Matrox DVCPRO, Matrox DVCPRO50, Microsoft Video 1, RAW I420, S-Mpeg 4), Windows Mobile, 3GP (H.263), WMV, FLV (VP6), and/or MXF video formats.

The video editing device 114 may receive, decode, store, and/or transmit metadata that is associated with the received video content. The source from which the metadata is received may be the same as or different from the source from which the video content is received. For example, the metadata may be received from video source 102 or from another source, such as a post-production source 116 for example. The metadata may be received at the video editing device 114, via a wireless or wired communication medium. For example, the metadata may be received via post-production communication network 118 and/or video router/switcher 112. Post-production communication network 118 may include any form of communication network capable of transmitting and/or receiving video content and/or metadata, such as a telecommunications network, the Internet, a file transfer protocol (FTP) communication network, and/or a local area network (LAN) for example.

The metadata received at the video editing device 114 may include closed caption data and/or visual key frames. For example, the video editing device 114 may capture and/or decode closed caption data that may be embedded (e.g., line 21 or EIA708) in one or more streams of video content. The closed caption data and/or visual key frames may be stored in the database along with the received video content. The closed caption data may be stored in portions of text, such as a word, a character, a letter, a phrase, or any other portion of text for example. For example, each word in the closed caption data may be stored in a separate location (e.g., cell or table) in the database. Similarly, each visual key frame may be stored in a separate location (e.g., cell or table) in the database. The video editing device 114 may store the metadata along with the assets in the database with a timestamp reference. For example, each portion of text rendered in the closed caption data may be stored with a corresponding timestamp reference. The timestamp reference may also be associated with a frame of video content to provide synchronization between the closed caption data and the frame of video content. Once the closed caption data is stored in the database and associated with the video content, users may search for any portion of text (e.g., a character, word, or phrase) inside the database to access a specific frame or frames of video content that correspond to the portion of text.

The video editing device 114 may send the data stored on the video editing device 114 to an end user for display and/or web-based editing. For example, the video editing device 114 may send the video content, metadata, timestamp reference, and/or visual key frames to computing device 122 and/or local producer 124. The sent data may include any form of data that may be displayed to an end user for web-based video editing. For example, the video content may include video frames, metadata, social media (e.g., FACEBOOK, TWITTER, etc.) data, or other forms of video content, as described herein for example. The video content may be distributed from the video editing device 114 in any format, at any resolution, bit-rate, and/or aspect ratio.

The computing device 122 may include any computing device capable of receiving and/or displaying video content and/or metadata, such as a desktop computer, a server, a television, and/or a mobile device (e.g. a laptop computer, a tablet, or smartphone) for example. The video editing device 114 may send data to the computing device 122 and/or local producer 124 via communication network 120. The communication network 120 may include any form of communication network capable of transmitting and/or receiving video content and/or metadata, such as a telecommunications network, the Internet, a file transfer protocol (FTP) communication network, a LAN, a WORLDNOW datacenter, and/or content delivery network (CDN) for example.

A user at the computing device 122 and/or the local producer 124 may access and edit the data stored at the video editing device 114 using a user interface (UI). According to an embodiment, the UI may be a customizable web-based UI, such as UI 300 or UI 400 illustrated in FIGS. 3 and 4 for example. The video editing device 114 may include a custom web server that may enable end users to connect to the application and/or access the video content streams (e.g., recorded or real time video content) through a web browser, such as Firefox or Internet Explorer for example. The UI may be presented to the end user enabling the user to display live or stored data (e.g., video content or metadata), edit live or stored data (e.g., video content or metadata), manage automated events, and/or schedule events on a video editing device 114. Multiple users may access the various functions of the video editing device 114 using multiple web-based UIs. The web-based UI may also be used to access and control the video editing device 114. A user's access may be based on the security context of their login credentials for example.

Figure 2:
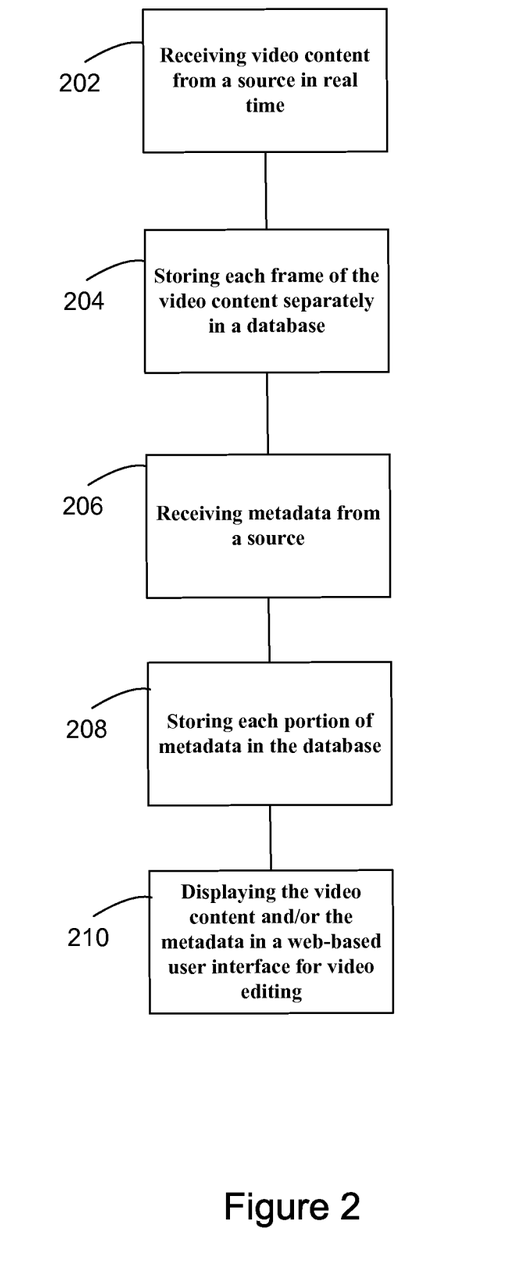
FIG. 2 is a diagram illustrating an exemplary implementation for displaying and/or editing video content.

FIG. 2 is a diagram illustrating an exemplary implementation for displaying and/or editing video content in a web-based environment using a computing device, such as video editing device 114 for example. As shown in FIG. 2, video content may be received from a source in real time at 202. Because the video content is received in real time, web-based video editing may be performed on live video content (e.g., as soon as a show starts). The video content may include one or more streams of video content. Each stream of video content may include one or more video frames. At 204, each frame of the video content may be stored separately in a database. For example, each frame may be stored in a separate cell or table in the database. Each frame may be stored with a corresponding timestamp reference. The timestamp reference may indicate the time at which the frame of video content was captured, received, and/or stored in the database. According to one example, the timestamp reference may be accurate to the nanosecond in which the frame of video content was captured, received, and/or stored in the database.

At 206, metadata may be received from a source. The source of the metadata received at 206 may be the same as or different from the source from which the video content is received at 202. The metadata may include closed caption data that is associated with the video content received at 202. At 208, each portion of the metadata may be stored in a database. The database may be the same as or different from the database in which the video content is stored at 204. According to an example embodiment, each portion of the metadata may be a portion of text (e.g., a word, character, or phrase) that is stored separately in the database. For example, each portion of text (e.g., a word, character, or phrase) may be stored in a separate cell or table in the database. One or more portions of the metadata may be stored with a corresponding timestamp reference. The timestamp reference that is stored with each portion of the metadata may be the same as, or associated with, a timestamp reference that is stored with one or more frames of the video content. The timestamp reference may indicate the time at which each portion of metadata was captured, received, and/or stored in the database.

At 210, the video content and/or the metadata may be displayed in a web-based UI for video editing. For example, the video content and/or the associated metadata may be displayed for and/or edited by an end user in a web browser (e.g., Firefox or Internet Explorer). The web-based UI may be displayed using a computing device, such as a desktop computer, a server, a television, or a mobile device (e.g. a laptop computer, a tablet, or smartphone) for example.

The video content and/or the metadata that is displayed at 210 may be pre-stored (e.g., recorded) or displayed in real-time. Thus, an end user may be able to view and/or edit one or more frames of the video content in real-time.

FIG. 3 is an exemplary illustration of a user interface (UI) 300 that may be displayed by a video editing device 114. As illustrated in FIG. 3, the UI 300 may include a video content display 302, a closed caption display 304, a visual scrubber bar 306, and/or a scrolling virtual record window 308.

The video content display 302 may be used to display one or more frames of video content and/or metadata to an end user for viewing and/or editing in a web-based environment. The frames of video content may be received in one or more streams. For example, the video editing device 114 may receive one or more streams of video content and/or metadata and display the one or more streams of video content and/or metadata on the video content display 302 for viewing and/or editing by an end user in a web-based environment. The displayed video content may be recorded video content that is retrieved from storage, or the video content may be displayed in real time.

The video content in video content display 302 may be controlled using the UI 300 and/or, in one example embodiment, using a remote control. As illustrated in FIG. 3, the UI 300 may include a play button, a rewind button, a fast forward button, and/or a pause button for controlling the video content in the video content display 302. The UI 300 may also include a visual scrubber bar 306 for controlling the video content in the video content display 302. The buttons on the UI 300 and/or the visual scrubber bar 306 may allow a user to play, pause, stop, fast-forward, slow down, and/or rewind live or recorded video content. An end user may begin manipulating the visual scrubber bar 306 or any other control functions within seconds of the capture process to view and/or edit one or more frames of the live or recorded video content. By capturing high and/or low resolution assets, the video editing device 114 may enable an end user to instantly access any point (e.g., video frame) in the captured segment, such as by clicking a point on the visual scrubber bar 306 in the UI 300 for example.

The video editing device 114 may use the frame-accurate database storage and/or video processing to render a frame-accurate scrolling virtual record window 308. According to an embodiment, each frame of video content may be stored in the form of a proxy frame. The video editing device 114 may receive video content at the database and may buffer the proxy video to the UI 300. Visual graphic thumbnails may be generated by the video editing device 114 and displayed in the frame-accurate scrolling virtual record window 308. The visual graphic thumbnails may represent a particular frame in the streaming video content. For example, each visual graphic thumbnail may be associated with the timestamp reference of a corresponding frame in the video content. An end user may select an individual graphic thumbnail to display and/or edit the video content at the video frame corresponding to the graphic thumbnail.

According to an embodiment, the video editing device 114 may generate visual graphic thumbnails once a change is detected in the video content. During the capture process, the video editing device 114 may utilize custom algorithms to analyze and/or detect changes from one frame to the next. For example, the change may be a change from one scene to another or a user-defined change from one frame to another. According to one example embodiment, scene changes may be detected in the capture process by converting each frame of video content into grayscale (e.g., with a color depth of 256 colors and/or configurable to 65000). A frame may be segmented into macroblocks to create regions in the video. Default macroblocks may be four-by-four pixels, but may be configured to larger blocks. Each corner of a region may create an x/y color value coordinate that may be compared to the previous frame's color value coordinate at the same position. If the change in color for a pixel coordinate, compared to the same pixel coordinate of one or more previous frames, is higher than a threshold (e.g., 30 percent), that may add to the score of total changed pixels' for the frame. A visual graphic thumbnail may be generated based on the total number of changed pixels from one frame to another. For example, if the total number of changed pixels for a frame, based on the threshold, is higher than fifty percent of the total pixels from the previous frame, a visual graphic thumbnail may be generated and stored in the database. Another configurable option is minimum and maximum settings to automatically generate the visual graphic thumbnail. The default setting may be to wait a minimum amount of time (e.g., one second) before generation a visual graphic thumbnail, but not waiting more than a maximum amount of time (e.g., five seconds).

Based on a user's configuration, a user may be able to adjust the sensitivity of the identification algorithm. For example, the user may set a minimum elapsed time and/or maximum duration between each visual graphic thumbnail generation into the database. The end user may access any frame in the video content to manually generate visual graphic thumbnails and/or export that frame of video content to a standalone graphic and in any resolution or size. The visual graphic thumbnails may be stored in the database on the video editing device 114 with the same frame accurate timestamp reference that is associated with the closed caption data and/or video frames described herein.

Inside the UI 300, the video editing device 114 may display a representation (e.g., linear representation) of closed caption data in the closed caption display 304. As illustrated in FIG. 4, the closed caption data may be displayed with the corresponding visual graphic thumbnail being displayed in the frame-accurate scrolling virtual record window 308. Each portion of the closed caption data may be stored and/or displayed with the underlying time reference to a frame in the video content. By clicking on any specific portion of text (e.g., word, character, or phrase) in the closed caption display 304, the corresponding frame of the video content (e.g., having the same time reference) may be displayed in the video content display 302 for review and/or editing in a web-based environment.

According to an embodiment, an end user may select a live broadcast button 312 on the UI 300 to start the live video content capture process. The end user may begin manipulating the visual scrubber bar 306 or any other control functions within seconds of the capture process to view and/or edit one or more frames of the video content in real-time. Alternatively, an end user may select the record button 310 on the UI 300 to start recording the video content for editing at a later time.

The video editing device 114 may enable the user, through the UI 300, to control the audio level of each sub clip before processing. For example, a user may modify the audio level of a sub clip using audio control button 314. The audio changes may be stored in the metadata within the database, as described herein for example.

FIG. 4 is another exemplary illustration of a user interface (UI) 400 that may be displayed by a video editing device 114. As illustrated in FIG. 4, the UI 400 may include a video content display 302, a closed caption display 304, a visual scrubber bar 306, a scrolling virtual record window 308, and/or a clip playlist 406.

The video editing device 114 may use a UI, such as UI 400, to facilitate frame accurate video editing in a web browser environment. For example, an end user may select to display and/or edit a video content on the video content display 302. As illustrated in FIG. 4, the end user may place a virtual marker, such as by performing a mark in and/or mark out, at a certain point in the streaming video content to create a sub clip 408 of the video content for storing on the video editing device 114. The virtual marker may include a router change from within the UI 400 or a manually created marker by the user denoting an event in the video, such as the start of a press conference for example. These virtual markers may serve as reference pointers and may be stored as metadata in the database. The mark in may be indicated by an end user selecting the mark-in button 402. The mark out may be indicated by the end user selecting the mark-out button 404. Alternatively, or additionally, the end user may perform the mark in and/or mark out by selecting a point on the frame-accurate scrolling virtual record window 308 or on the visual scrubber bar 306. The sub clip 408 may be a frame-accurate sub clip. For example, the exact frame, metadata, and/or timeframe reference at the beginning and end of the sub clip 408 may be indicated by the end user and stored on the video editing device 114. The sub clip 408 may be displayed in a clip playlist 406 for later display and/or editing in the video content display 302. A user may add notes associated with a virtual marker to help track each marker.

While the creation of frame-accurate sub clip 408 is described as being performed by an end user in a UI, one or more frame-accurate sub clips may be created automatically using similar marking methods at the video editing device 114. The automatic creation of one or more frame-accurate sub clips may be based on profile or configuration options set by an end user.

The mark in and/or mark out indications (e.g., virtual markers) may cause the video editing device 114 to generate a pointer that points to a portion of video content (e.g. one or more frames), a portion of metadata (e.g., one or more characters or words), and/or a timestamp reference stored on the video editing device 114. For example, the mark in pointer may point to the video frame, portion of metadata, and/or timestamp reference associated with the beginning of a sub clip. Similarly, the mark out pointer may point to the video frame, portion of metadata, and/or timestamp reference associated with the end of the sub clip. The mark in and/or mark out pointers may be used to instruct the video editing device 114 to create standalone sub clip(s). The video editing device 114 may use these frame accurate markers to execute an internal process to create file-based video assets in any video format requested by an end user.

The video editing device 114 may provide a user-definable transition at the start and/or end of each sub clip. The transition may be defined according to a number of frames and/or time desired for the transition. For example, a user may indicate, via UI 400, a desire for a 15 frame transition between the end of one sub clip and the beginning of another. This transition may be referred to as a "fade up from black" or a "fade to black" for example.

According to an embodiment, the video editing device 114 may have internal scheduling that may be managed through the UI to created scheduled recordings for archive and/or later processing. Using the video editing device 114, a scheduled record event may be created with tasks to be carried out, either during the scheduled event or after it concludes. In one embodiment, the video editing device 114 may automatically record video content at a scheduled time. For example, the video editing device 114 may record the Friday Night High School Sports Show from 11:15 p.m. to 11:35 p.m. each Friday night. The scheduled recording may be included in a user profile for example. The video editing device 114 may create multiple sub clips based on the user profile and/or instructions associated with the scheduled record event.

According to an embodiment, the live and/or recorded video content may contain undesirable content, such as commercial breaks for example, that the video editing device 114 may automatically identify. The video editing device 114 may remove the undesirable content (e.g., commercial breaks) from the final file and create a standalone file-based video file. For example, an end user may schedule a task (e.g., in the user profile) to instruct the video editing device 114 to remove the undesirable content from the video content.

Figure 5:
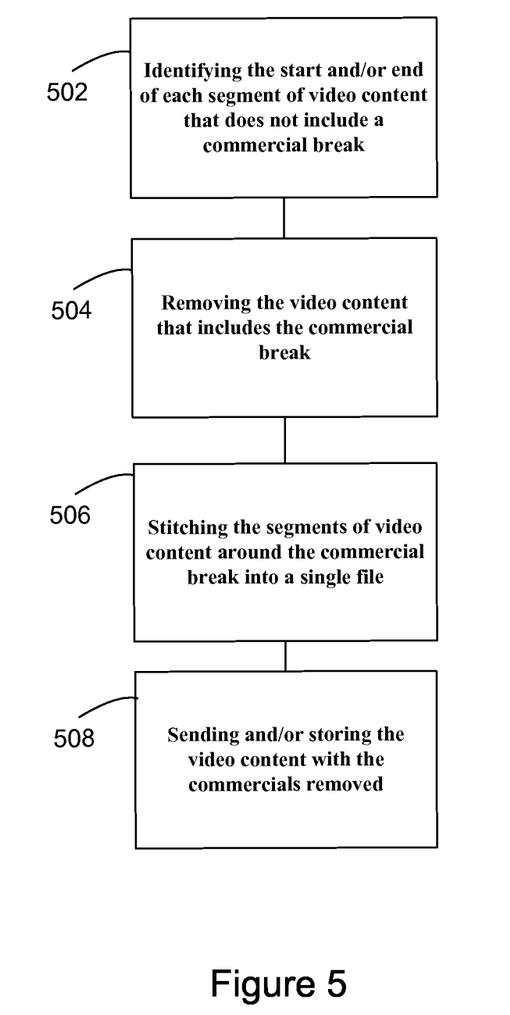
FIG. 5 is a diagram illustrating an exemplary implementation for frame-accurate removal of undesirable content from video content.

FIG. 5 illustrates an implementation of frame-accurate removal of undesirable content (e.g., commercials) from video content using the video editing device 114 described herein. While FIG. 5 illustrates the frame-accurate removal of a commercial break from video content, the use of a commercial break is merely illustrative, as similar steps may be performed for frame accurate removal of any undesirable content from video content. As illustrated in FIG. 5, at 502, the video editing device 114 may identify the start and/or end of each segment of video content that does not include a commercial break. For example, the video editing device 114 may identify the first and/or last frame of video content that does not include a commercial. The video editing device 114 may also identify the first and/or last frame of the video content comprising the commercial. The frames of video content may be identified and retrieved from storage on the video editing device 114.

The video editing device 114 may remove the video content that includes the commercial break at 504. For example, the video editing device 114 may delete the video frames that include the commercial from the database stored on the video editing device 114. At 506, the video editing device 114 may stitch the segments around the commercial break into the single file. The finished file may be sent to a final destination and/or stored in memory at 508. A notification may be sent out for verification that the commercials have been removed at a later time. The sending of the file, storing of the file, and/or sending of the notification may be based on a user profile for this event.

The video editing device 114 may also enable insertion of graphics into the video content. The graphics may be inserted by manual execution or automated task for example. The graphics may be inserted on top of the video content and may cover the video window in a sub clip. The graphics may include a locally stored file (e.g., PNG with alpha channel) that may be loaded and transposed/keyed over the video content at certain video markers in a timeline, such as when the sub clip is generated for example. The local graphic may be pre-built in proportions of a video window so as to allow proper scaling to other formats and sizes. According to one example embodiment, the overlaid graphics may be blended into the final sub clips that the video editing device 114 creates, but may not be included in the master recordings.

A user may use the video editing device 114 to create transitions between video sub clips. For example, the video editing device 114 may be configured to fade to a full screen graphic at the end of a sub clip and/or extend the sub clip for a set period of time. According to one implementation, if a sub clip is one minute long, the user may use the video editing device 114 to fade to a full screen graphic at fifty-seven seconds, while maintaining the audio track being played. In another implementation, the user may instruct the video editing device 114 to fade to a full screen graphic at the one minute mark, but extend the overall sub clip duration for an additional three seconds and then fade to black. This may create a one minute and three second sub clip in duration.

The video editing device 114 may automate the user-initiated functions described herein and/or perform the automated functions described herein by monitoring signals from one or more sources. For example, the video editing device 114 may monitor signals in real time from one or more input points to execute automated internal functions. An exemplary facilitation of these signals may be a discrete, embedded command language injected into a closed caption data stream that is intercepted by the video editing device 114 and acted on. For example, individual story edit points and/or metadata may be inserted into a newsroom script during the newscast production process that is rendered at the video editing device 114 during capture. These small data frames, which may not be displayed at an end user's device (e.g., on a television at a viewer's home), may instruct the video editing device 114 to perform various functions. For example, the data frames may indicate where a portion of video content (e.g., television show) begins and/or where the portion ends. The video editing device 114 may access these specific points in the stream of video content based on user configuration or profile rules for example. The points in the stream of video content may be accessed by applying a pre-determined offset of time due to the delay of the closed caption data stream from the stream of video content. The video editing device 114 may virtually edit this sub clip from the database into a file-based asset and distribute the content to a user's website management system (UMS) or any other destination for example, passing along any metadata to the end destination.

Additional or alternative external triggers may be utilized by the video editing device 114 to automatically create frame accurate, file-based video content. Some examples of these triggers may include serial triggers (e.g., rs422 or rs232), external XML data files, GPI contact closures (e.g., reverse tally), sub-aural audio tones, and/or MOS status messages from the newsroom content systems (e.g., ENPS/iNews). The video editing device 114 may be configured to manage and/or process video content with little or no human interaction. At the conclusion of automated processing, the video editing device 114 may update internal destinations, such as with an XML push document and/or email for example.

Figure 6:
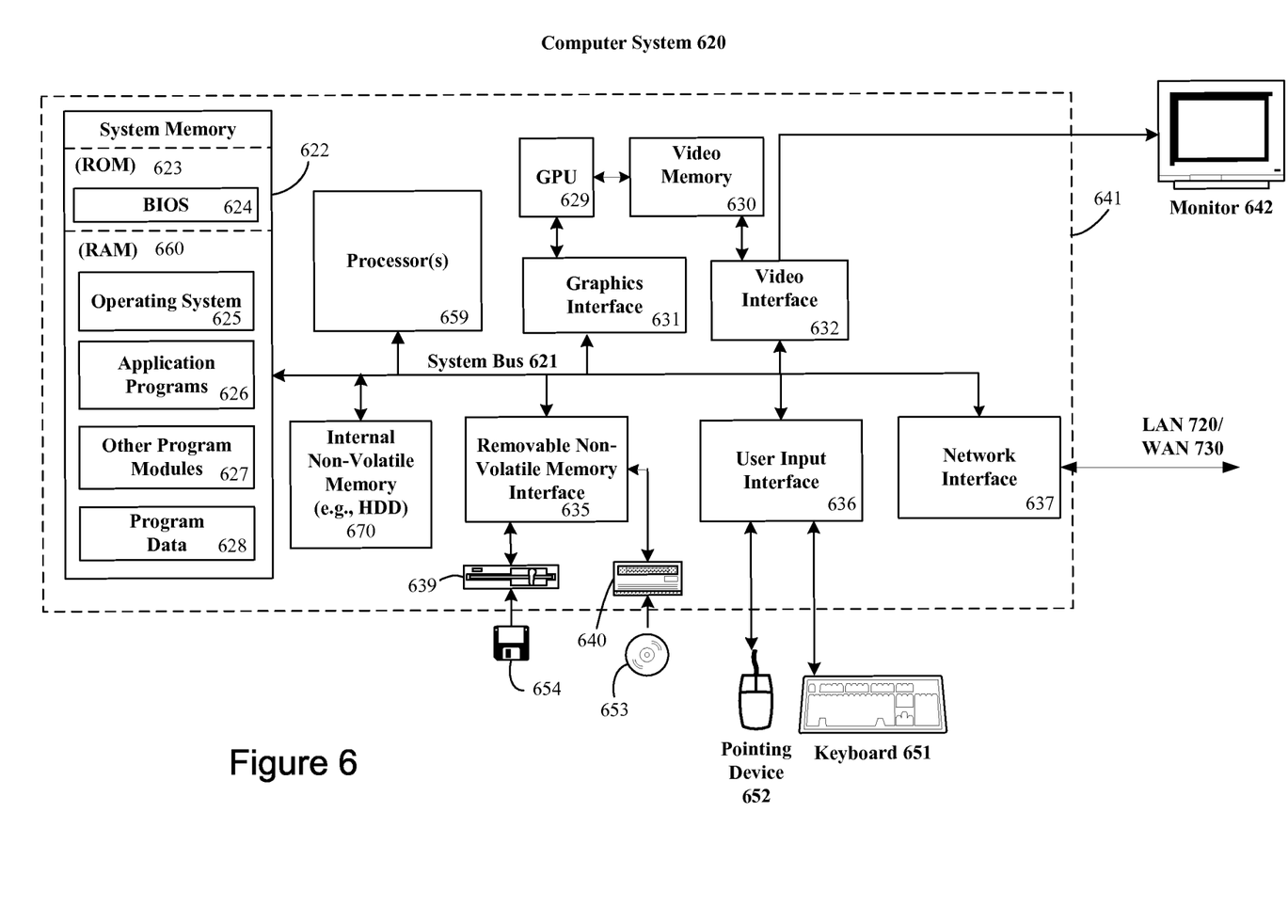
FIG. 6 is a block diagram of one embodiment of a computer system in which aspects of the disclosed systems and methods may be embodied.

FIG. 6 is a block diagram of an example computer system 620 on which the embodiments described herein and/or various components thereof may be implemented. For example, the functions performed by the entities described in the various embodiments above may be performed by one or more such example computer systems. For example, the video editing device 114, a video source 102, post production source 116, computing device 122, and/or local producer 124 may be implemented in software (i.e., computer executable instructions or program code) executing on one or more such computer systems 620. It is understood, however, that the computer system 620 is just one example of a suitable computing environment and is not intended to suggest any limitation as to the scope of use or functionality of the presently disclosed subject matter. Neither should the computer system 620 be interpreted as having any dependency or requirement relating to any one or combination of components illustrated in FIG. 6. In some embodiments, the various depicted computing elements may include modules or components configured to instantiate specific aspects of the present disclosure. For example, the terms "module" or "component" used in this description may include specialized hardware components configured to perform function(s) by firmware or switches. In other example embodiments, the terms "module" and "component" may include a general purpose processor, memory, etc., configured by software instructions that embody logic operable to perform function(s). In example embodiments where modules or components include a combination of hardware and software, an implementer may write source code embodying logic and the source code may be compiled into machine readable code that can be processed by the general purpose processor. Since the state of the art has evolved to a point where there is little difference between hardware, software, or a combination of hardware/software, the selection of hardware versus software to effectuate specific functions is a design choice left to an implementer. More specifically, a software process may be transformed into an equivalent hardware structure, and a hardware structure may itself be transformed into an equivalent software process. Thus, the selection of a hardware implementation versus a software implementation is one of design choice and left to the implementer.

In FIG. 6, the computer system 620 comprises a computer 641, which may include a variety of computer readable media. Computer readable media may be available media that may be accessed by computer 641 and may include volatile and/or nonvolatile media, removable and/or non-removable media. The system memory 622 may include computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, may be stored in ROM 623. RAM 660 may contain data and/or program modules that are immediately accessible to and/or presently being operated on by processing unit 659. By way of example, and not limitation, FIG. 6 illustrates operating system 625, application programs 626, other program modules 627, and program data 628. As a further example, video content (e.g. video frames) and/or metadata (e.g. closed caption data), in one embodiment, may be stored in the system memory 622, as well as in any of a variety of non-volatile memory media discussed herein.

The computer 641 may also include other removable/non-removable, volatile/nonvolatile computer storage media. By way of example, the computer 641 may include a hard disk drive 670 that reads from or writes to non-removable, non-volatile magnetic media, a magnetic disk drive 639 that reads from or writes to a removable, nonvolatile magnetic disk 654, and an optical disk drive 640 that reads from or writes to a removable, nonvolatile optical disk 653 such as a CD ROM or other optical media. Other removable/non-removable, volatile/nonvolatile computer storage media that can be used in the exemplary operating environment include, but are not limited to, magnetic tape cassettes, solid-state drives, flash memory cards, digital versatile disks, digital video tape, solid state RAM, solid state ROM, and the like. Magnetic disk drive 639 and optical disk drive 640 may be connected to the system bus 621 by a removable memory interface, such as interface 635. The drives and their associated computer storage media discussed herein, and illustrated in FIG. 6, may provide storage of computer readable instructions, data structures, program modules and other data for the computer 641.

A user may enter commands and information into the computer 641 through input devices such as a keyboard 651 and/or pointing device 652, commonly referred to as a mouse, trackball, or touch pad. Other input devices (not shown) may include a microphone, joystick, game pad, satellite dish, scanner, or the like. These and other input devices may be connected to the processing unit 659 through a user input interface 636 that is coupled to the system bus, but may be connected by other interface and/or bus structures, such as a parallel port, game port, or a universal serial bus (USB) for example. The computer may connect to a local area network or wide area network, such as LAN 720 and/or WAN 730, through a network interface or adapter 637.

As is apparent from the embodiments described herein, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., computer executable instructions). This program code may be stored on a computer-readable storage medium, such as a magnetic, electrical, or optical storage medium, including without limitation a floppy diskette, CD-ROM, CD-RW, DVD-ROM, DVD-RAM, magnetic tape, flash memory, solid-state drive, hard disk drive, or any other machine-readable storage medium, wherein, when the program code is loaded into and executed by a machine, such as a computer or server, the machine becomes an apparatus for practicing the invention. A computer on which the program code executes may include a processor, a storage medium readable by the processor (including volatile and/or non-volatile memory and/or storage elements), at least one input device, and/or at least one output device. The program code may be implemented in a high level procedural or object oriented programming language. Alternatively, the program code may be implemented in an assembly or machine language. In any case, the language may be a compiled or interpreted language. When implemented on a general-purpose processor, the program code may combine with the processor to provide a unique apparatus that operates analogously to specific logic circuits. As used herein, the terms "computer-readable medium" and "computer-readable storage medium" do not include a transient signal.

As the foregoing illustrates, the present invention is directed to systems, methods, and apparatus for capturing and/or editing of video content in a web-based environment. Changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims. For example, while data received at the video editing device 114 (e.g., video content, metadata, and/or timestamp references) are described herein as being stored in a database, the data received at the video editing device 114 may be stored in any form of storage on a computing device.

What is claimed:

1. A method comprising:
   receiving a stream of video content from at least one source, wherein the stream of video content comprises frames of the video content;
   storing, in real time while receiving the stream of video content, a frame of the video content in a database separately from other frames of the video content;
   receiving closed caption data associated with the video content;
   storing the closed caption data in the database;
   creating a visual graphic thumbnail that is representative of the frame of the video content;
   associating the frame of the video content, the closed caption data, and the visual graphic thumbnail with a timestamp reference; and
   sending, via a web interface, the frame of the video content, the visual graphic thumbnail, and the closed caption data for being displayed in a time-synchronized manner to enable editing of the video content, wherein the frame of the video content, the visual graphic thumbnail, and the closed caption data are sent in real time while receiving the stream of video content.

2. The method of claim 1, wherein storing the frame of the video content in the database further comprises storing the frame of the video content in a cell of the database.

3. The method of claim 1, further comprising determining a portion of the video content to be edited, wherein the portion of video content begins with the frame of the video content.

4. The method of claim 3, wherein the portion of the video content to be edited is determined based on a portion of text in the closed caption data that corresponds with the frame of the video content.

5. The method of claim 1, wherein editing the video content comprises removing an undesirable portion of the video content.

6. The method of claim 5, wherein the undesirable portion comprises a commercial.

7. The method of claim 1, wherein the visual graphic thumbnail corresponds to a scene change in the video content.

8. The method of claim 1, wherein the video content is at least one of standard definition video content or high definition video content.

9. The method of claim 1, further comprising editing the video content by automatically removing the frame of the video content based on an indication included in the closed caption data.

10. The method of claim 1, wherein the frame of the video content is sent to a mobile device.

11. The method of claim 1, further comprising streaming the video content, via a public communication network, for live viewing.

12. The method of claim 1, wherein the at least one source comprises a first source and a second source, and wherein receiving the video content from the at least one source further comprises:
    receiving the video content from the first source;
    receiving, via the web interface, an indication to receive the video content from the second source;
    determining, based on the indication, to receive the video content from the second source; and
    receiving the video content from the second source.

13. A system comprising:
    a processor configured to:
       receive a stream of video content from a source, wherein the stream of video content comprises frames of the video content and closed caption data associated with the video content;
       store, in real time while the stream of video content is being received, a frame of the video content in a database separately from other frames of the video content;
       store the closed caption data in the database;
       create a visual graphic thumbnail that is representative of the frame of the video content;
       associate the frame of the video content, the closed caption data, and the visual graphic thumbnail with a timestamp reference; and
       send, via a web interface, in real time while the stream of video content is being received, the frame of the video content, the visual graphic thumbnail, and the closed caption data for being displayed in a time-synchronized manner to enable editing of the video content.

14. The system of claim 13, wherein the processor is further configured to store the frame of the video content in a cell of the database.

15. The system of claim 13, wherein the processor is further configured to determine a portion of the video content to be edited, wherein the portion of the video content begins with the frame of the video content.

16. The system of claim 15, wherein the processor is further configured to determine the portion of the video content to be edited based on a portion of text in the closed caption data that corresponds with the frame of the video content.

17. The system of claim 13, wherein the processor is further configured to edit the video content by removing an undesirable portion of the video content.

18. The system of claim 13, wherein the visual graphic thumbnail corresponds to a scene change in the video content.

19. The system of claim 13, wherein the video content is at least one of standard definition video content or high definition video content.

20. The system of claim 13, wherein the closed caption data comprises a portion of text.

21. The system of claim 13, wherein the processor is further configured to edit the video content by automatically removing the frame of the video content based on an indication included in the closed caption data.

22. A computer-readable storage medium that is not a transient signal, the computer-readable storage medium having computer executable instructions stored thereon, wherein the computer executable instructions are configured to cause a computer processor to:
    receive a stream of video content from a source, wherein the stream of video content comprises frames of the video content;
    store, in real time while the stream of video content is being received, a frame of the video content in a database separately from other frames of the video content;

receive closed caption data associated with the video content;
store the closed caption data in the database;
create a visual graphic thumbnail that is representative of the frame of the video content;
associate the frame of the video content, the closed caption data, and the visual graphic thumbnail with a timestamp reference; and
send, via a web interface, in real time while the stream of video content is being received, the frame of the video content, the visual graphic thumbnail, and the closed caption data for being displayed in a time-synchronized manner to enable editing of the video content.

* * * * *